(12) United States Patent
Solenthaler

(10) Patent No.: US 9,950,823 B2
(45) Date of Patent: Apr. 24, 2018

(54) APPARATUS FOR ULTRASONIC WELDING

(71) Applicant: TELSONIC HOLDING AG, Bronschhofen (CH)

(72) Inventor: Peter Solenthaler, St. Margarethen (CH)

(73) Assignee: TELSONIC HOLDING AG, Bronschhofen (CH)

( * ) Notice: Subject to any disclaimer, the term of this patent is extended or adjusted under 35 U.S.C. 154(b) by 372 days.

(21) Appl. No.: 14/782,378

(22) PCT Filed: Mar. 17, 2014

(86) PCT No.: PCT/EP2014/055288
§ 371 (c)(1),
(2) Date: Oct. 5, 2015

(87) PCT Pub. No.: WO2014/166702
PCT Pub. Date: Oct. 16, 2014

(65) Prior Publication Data
US 2016/0052658 A1  Feb. 25, 2016

(30) Foreign Application Priority Data
Apr. 9, 2013  (EP) .................................... 13162831

(51) Int. Cl.
*B32B 37/00* (2006.01)
*B65B 51/22* (2006.01)
(Continued)

(52) U.S. Cl.
CPC .............. *B65B 51/225* (2013.01); *B06B 3/00* (2013.01); *B29C 65/08* (2013.01);
(Continued)

(58) Field of Classification Search
CPC . B29C 65/08; B29C 66/81431; B29C 66/949; B65B 51/225; B06B 3/00
(Continued)

(56) References Cited

U.S. PATENT DOCUMENTS 4,764,907 A   8/1988  Dahlstrom et al.
5,865,946 A   2/1999  Rábe
(Continued)

FOREIGN PATENT DOCUMENTS

DE      1 427 629        1/1969
DE    295 03 122 U1      4/1995
(Continued)

OTHER PUBLICATIONS

International Search Report Corresponding to PCT/EP2014/055288 dated Jun. 2, 2014.
(Continued)

*Primary Examiner* — James Sells
(74) *Attorney, Agent, or Firm* — Davis & Bujold PLLC; Michael J. Bujold

(57) ABSTRACT

An apparatus (1) for ultrasonic welding which comprises a sonotrode (2) with an elongate sonotrode head (4), on which an elongate welding surface (5) oriented in the longitudinal direction of the sonotrode head (4) is formed. The apparatus (1) further comprises at least two converters (11) for exciting ultrasonic vibrations of the sonotrode (2) in a direction of action (B). The direction of action (B) is preferably oriented substantially perpendicular to the longitudinal direction (A) of the sonotrode head (14). Finally, the apparatus (1) comprises a reaction body (3) as a reaction mass, the at least two converters (11) are arranged between the sonotrode (2) and the reaction body (3).

19 Claims, 3 Drawing Sheets

Figure 1:
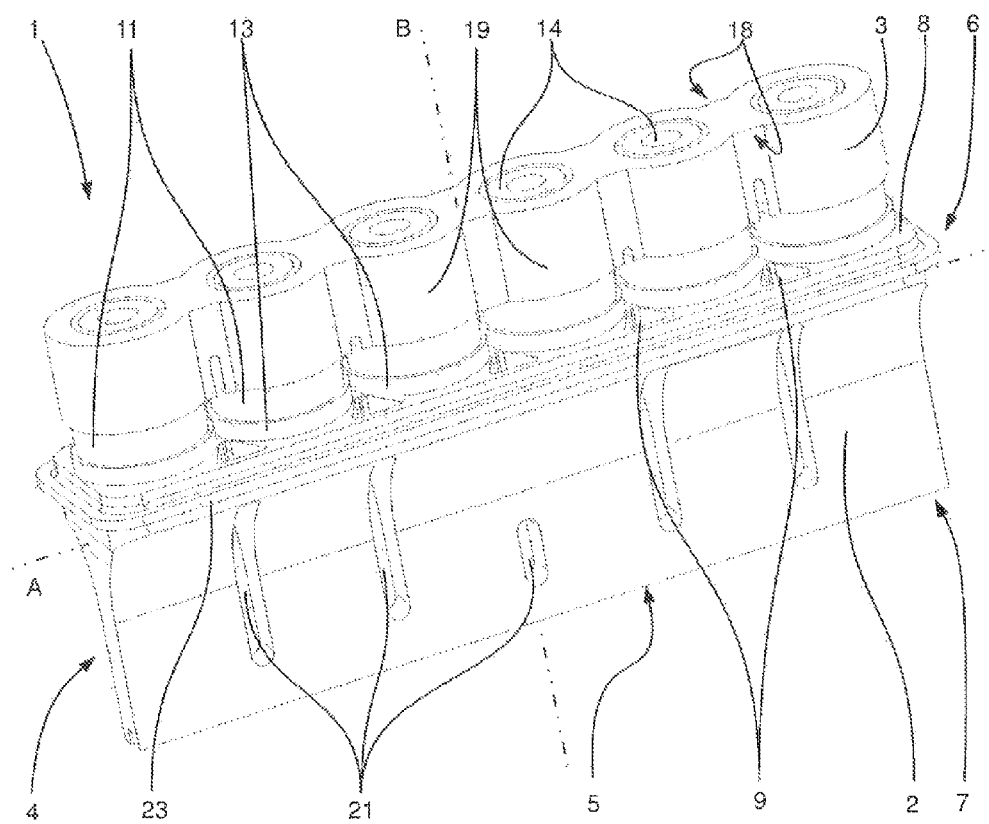

(51) Int. Cl.
*B06B 3/00* (2006.01)
*B29C 65/08* (2006.01)
*B29C 65/00* (2006.01)
*B29L 31/00* (2006.01)

(52) U.S. Cl.
CPC .... *B29C 66/8145* (2013.01); *B29C 66/81431* (2013.01); *B29C 66/849* (2013.01); *B29C 66/1122* (2013.01); *B29C 66/4312* (2013.01); *B29C 66/72328* (2013.01); *B29C 66/7392* (2013.01); *B29C 66/73921* (2013.01); *B29L 2031/712* (2013.01)

(58) Field of Classification Search
USPC .................................. 156/73.1, 580.1, 580.2
See application file for complete search history.

(56) References Cited

U.S. PATENT DOCUMENTS

| | | | | |
|---|---|---|---|---|
| 6,605,178 | B1* | 8/2003 | Shinohara | B29C 65/08 156/379.6 |
| 7,802,604 | B2 | 9/2010 | Martin et al. | |
| 8,591,679 | B1* | 11/2013 | Hull | B65D 25/00 156/580.1 |
| 2009/0283570 | A1 | 11/2009 | Gerdes et al. | |
| 2013/0240153 | A1* | 9/2013 | Hull | B29C 65/08 156/580.2 |
| 2015/0107780 | A1* | 4/2015 | Hull | B29C 65/7882 156/580.1 |

FOREIGN PATENT DOCUMENTS

| | | |
|---|---|---|
| DE | 10 2005 038 344 A1 | 2/2007 |
| EP | 0 615 907 A1 | 9/1994 |
| EP | 1 066 951 A2 | 1/2001 |
| EP | 1 088 760 A2 | 4/2001 |
| EP | 1 097 869 A1 | 5/2001 |
| EP | 1 127 794 A2 | 8/2001 |
| EP | 2 368 694 A1 | 9/2011 |
| JP | H09122588 A | 5/1997 |
| JP | 2011523374 A | 8/2011 |
| WO | 2011/117119 A1 | 9/2011 |

OTHER PUBLICATIONS

Written Opinion Corresponding to PCT/EP2014/055288 dated Jun. 2, 2014.
Japanese Office Action issued in corresponding Japanese Patent Application No. 2016-506826 dated Dec. 5, 2017.

* cited by examiner

APPARATUS FOR ULTRASONIC WELDING

The invention relates to an apparatus for ultrasonic welding.

Apparatuses for ultrasonic welding usually have a converter and a sonotrode. The converter converts an electrical oscillation, generated by a generator, into mechanical motion, e.g. by means of piezoelectric materials. The thus generated mechanical vibrations are introduced into the sonotrode, which is excited to vibrate, insofar as possible, in an eigenmode. For the purpose of applying the vibrations to weld material, the sonotrode typically has a welding surface on a sonotrode head. In addition, a booster may be provided, which amplifies a vibration amplitude at the welding surface. The booster in this case can be achieved, for example, by a special geometric design of the sonotrode, or sonotrode head.

Such apparatuses are used, inter alia, in packaging facilities, in which a packaging material comprising, for example, a laminate composed of paper and thermoplastic material is shaped, for example, to form a container that is closed after having been filled. Typically, the containers are rectangular, parallelepiped or tetrahedral in form, and are filled with a liquid such as, for example, a juice or milk. The container is generally shaped from a continuous web of the packaging material and, after having been filled, is sealed and separated. Typically, a heat welding method is used in shaping and sealing the container. While thermal energy can be applied in a variety of ways, depending on the packaging material (e.g. by induction, if the packaging material comprises a conductive layer such as, for example, an aluminum foil), it has been found that the introduction of ultrasonic vibrations for the purpose of heating the laminate in the welding region can be applied in a particularly versatile manner.

Depending on the shape of the containers, however, comparatively long weld seams are required. In order to achieve uniform welding and/or sealing, the ultrasonic vibrations must be introduced as uniformly as possible over the entire welding region.

For this purpose, known apparatuses, for example as described in EP 615 907 A1, have a plurality of sonotrodes that are arranged next to each other and that have elongate welding surfaces. Each sonotrode is excited by respectively one converter, which is disposed on a back side of the sonotrode. Each converter carries a counterweight as a reaction mass. In order to create overall a sonotrode having a half wavelength, at the converter there are additionally a plurality of reaction bodies disposed on the back side of the sonotrode. Since individual sonotrodes are arranged next to each other, the welding surface is interrupted at the transition from one sonotrode to the adjacent sonotrode. A weld seam produced by means of this arrangement, particularly in the case of welding of thin materials such as foils, can thus likewise be interrupted at these locations. These gaps in the weld seam result, for example, in unwanted leakage, particularly in the case of packaging of liquids.

WO 2011/117119 A1 therefore proposes exciting an elongate sonotrode, realized as a single piece, by means of three converters arranged in a distributed manner over its length. Uniform excitation of the sonotrode is essential in this case, since uneven mechanical loading may result in premature material fatigue and damage. The converters of WO 2011/117119 A1 are each arranged in associated recesses that are realized on a back side of the sonotrode and that to a large extent completely envelop the converters disposed therein. The sonotrode has slots, extending through perpendicularly in relation to a longitudinal direction, that reduce unwanted vibration modes for a more uniform welding result. Although this sonotrode does deliver satisfactory welding results, its production is elaborate and cost-intensive. Moreover, the design of the sonotrode is comparatively complicated and occupies a lot of space.

It is therefore the object of the invention to overcome the disadvantages of the prior art. In particular, it is an object of the invention to create an ultrasonic welding apparatus of compact design that is inexpensive and easy to produce and that, in particular, ensures uniform welding, even with the sonotrode being of an elongate design. In addition, an efficient input of energy into the welding material is to be ensured.

These objects are achieved by the features of the independent claim. The latter relates to an apparatus for ultrasonic welding, comprising a sonotrode having an elongate sonotrode head, realized on which there is an elongate welding surface oriented in the longitudinal direction of the sonotrode head, at least two converters for exciting ultrasonic vibrations of the sonotrode in a direction of action, wherein the direction of action is preferably oriented substantially perpendicularly in relation to the longitudinal direction of the sonotrode head, and a reaction body as a reaction mass. The apparatus is distinguished in that the at least two converters are arranged between the sonotrode and the reaction body. In particular, the sonotrode and the reaction body in this case are arranged in the direction of action, with converters located therebetween.

The reaction body realized as a reaction mass is preferably realized as a separate component, which is separate from the sonotrode. The reaction body and the sonotrode are each preferably realized as a single-piece, continuous component. Since there is only the one single reaction body serving as a reaction mass for the at least two converters and the sonotrode, the apparatus can be of a particularly simple design. Moreover, the reaction body creates an additional coupling, by means of which the vibration behavior of the apparatus can be selectively optimized in favor of a uniform vibration of the welding surface. In particular, unwanted vibration behavior of the sonotrode can be additionally compensated comparatively easily through selective design of the reaction body.

Since the converters are arranged between the reaction body and the sonotrode, the reaction body can act simultaneously as a counterweight of the converters, and also as a reaction mass for the sonotrode. Since the components can be arranged, for example, in a stacked manner in the direction of action (converters between the sonotrode and reaction body), the arrangement also naturally corresponds to the direction defined by the direction of action.

The sonotrode head may be designed, in a known manner, in the shape of a blade, for example, and in cross section, perpendicularly in relation to the longitudinal direction, diverge from the welding surface, at least port tonally along concave curves, toward the back side. The curves in this case may be defined, for example, by a circle segment, an exponential function or a catenoid. The sonotrode head may be opened in the transverse direction, in a known manner, by slots oriented in the direction of action, in order to compensate or eliminate unwanted vibration modes, e.g. perpendicularly in relation to the direction of action.

It is understood that there may be a plurality of converters, depending on the length of the sonotrode head. Preferably, the converters in this case are arranged between the reaction body and the sonotrode. Also conceivable in principle, however, are apparatuses in which a reaction body is assigned respectively to groups of at least two converters.

Preferably, the sonotrode has a largely continuous, in particular planar, back side, which is opposite the welding surface in the direction of action and against which bear the at least two converters. Since, according to the invention, the at least two converters are arranged between the sonotrode and the reaction body, there is no need, on the back side of the sonotrode, for any structures serving as reaction bodies and/or realized to receive the converters. Clearly, depending on the requirements, slight depressions, for example, may be realized for arranging the converters. Although, in principle, this does render production more elaborate, it can still nevertheless be considered, depending on the requirement. Preferably, however, the back side of the sonotrode is realized as a largely continuous, planar surface. It is understood that the largely continuous back side may be opened in places, for example by screw holes and/or recesses, in order to reduce mass.

Likewise, advantageously, on the sonotrode side, the reaction, body has a bearing contact surface, in particular a planar bearing contact surface, against which bear the at least two converters. The reaction body and/or the sonotrode in this case may be realized in such a manner that no structure of the respective component, projects beyond the bearing contact surface, or back side, toward the respectively other component. It is understood that there may be slight recesses or structures present on the bearing contact surface. For example, slight depressions might be realized, for arranging the converters. Although, in principle, this does render production more elaborate, it can still nevertheless be considered, depending on the requirement.

Preferably, the bearing contact surface of the reaction body and the back side of the sonotrode are oriented substantially parallelwise in relation to each other. In this way, converters that are realized, for example, largely in the form of a circular cylinder can be arranged with easily realized plane-parallel end faces on the back side, on the one hand, and on the bearing contact surface, on the other hand. In particular, the converters do not need to be realized in a special manner. The converters in this case may bear against the respective surface directly or via contact elements such as, for example, contact plates or contact discs. The contact elements in this case may be part of the converters, or separate components arranged between the converters and the corresponding surface.

The at least two converters in this case may be clamped-in between the reaction body and the sonotrode. The reaction body, the at least two converters and the sonotrode thus form a stack that can be produced in a structurally simple manner. If, for example, the reaction body is appropriately screw-connected to the sonotrode, an optimum mechanical and thermal contact, of both the reaction body and the sonotrode to the converters, can be realized by means of the clamping action. On the one hand, this enables the mechanical vibrations of the converters to be optimally introduced into the sonotrode. On the other hand, heat generated in the converters can be optimally removed via the sonotrode and/or reaction body.

Preferably, there is a screw assigned to each of the at least two converters, by means of which screw the reaction body is screw-connected to the sonotrode, in particular by a through-passage in the respective converter. An optimum clamping effect that is centered in respect of a direction of action of the converters can thereby be achieved in a simple manner.

Preferably, the reaction body is realized so as to be elongate, in particular as a bar, and is oriented with its longitudinal direction parallel to the longitudinal direction of the sonotrode head. The reaction body is thus optimally matched to the sonotrode and of a compact design. Preferably, a dimensioning of the reaction body in the longitudinal direction corresponds substantially to the corresponding dimensioning of the sonotrode head.

Advantageously, the at least two converters are disposed in series in the longitudinal direction of the sonotrode head. The vibrations introduced by the converters are thus optimally distributed to the elongate sonotrode. In the case of more than two converters, adjacent converters are preferably each at a constant distance from one another. It is also conceivable in principle, in she case of a plurality of converters, for the latter to be arranged in a pattern such as, for example, in two parallel rows or in a pattern that, for example, is favorable in respect of vibration. Normally, owing to the elongate shape of the sonotrode head, it is preferred that they be arranged in series in the longitudinal direction.

The reaction body may have a narrowing in a region between the at least two converters, in particular largely perpendicularly in relation to the direction of action and in relation to the longitudinal direction. In the case of a plurality of converters, the reaction body may have a corresponding narrowing between each adjacent pair of the converters. Owing to the narrowings, material can be saved and a vibration behavior can be optimized. Preferably, the narrowing is symmetrical in a direction perpendicular to the direction of action and the longitudinal direction.

For this purpose, the reaction body, in particular in the case of an apparatus having more than two converters, may also have a slot in a region between two converters that are adjacent in the longitudinal direction, which slot, in particular, is open toward the sonotrode and preferably oriented, in the direction of action. The slot in this case preferably extends completely through the reaction body, transversely in relation to the longitudinal direction. The slot constitutes a further narrowing of the reaction body, by means of which the vibration behavior of the reaction body can be adapted to the requirements.

Preferably, there is a slot realized in each region between two converters that are adjacent in the longitudinal direction. The slots in this case may be realized as previously described, in particular open toward the sonotrode and preferably oriented in the direction of action. In the case of an even number of converters, however, the slot may be omitted, at a middle pair.

Preferably, slots that are at a greater distance from a longitudinal center of the reaction body have a greater depth. The depth of the slots thus increases, the closer the slots are to the longitudinal ends of the reaction body. In this way, the vibration behavior of the reaction body can be influenced selectively, in particular toward the longitudinal ends.

Overall, the apparatus may be realized so as to be substantially mirror-symmetrical in respect of a plane perpendicular to the longitudinal direction of the sonotrode head. In this case, there may be slight deviations from symmetry, such as, for example, one-sided connections for the converters. The plane of symmetry is thus revealed to be the plane that is perpendicular on the longitudinal direction and that goes through the longitudinal center of the sonotrode and of the reaction body.

Preferably, each of the at least two converters comprises at least one piezoelectric ceramic plate, preferably a stack comprising a plurality of piezoelectric ceramic plates. The ceramic plates are usually circular in form, such that, if a plurality of plates are stacked, a largely circular cylindrical stack is produced. In principle, any other converters, based on other electrostrictive and/or magnetostrictive materials, may also be used.

The converters may each comprise a contact element, which is realized, for example, as a contact plate. The contact element is realized, in particular, in a contact region for contacting the sonotrode to the converter and/or also in a contact region for contacting the reaction body. The contact plate may comprise, for example, a metal, such as aluminum. The contact element may also be realized as a separate component, and disposed between the converters and sonotrode and/or, if appropriate, between the converters and the reaction body. The contact elements provide for an optimum thermal and mechanic contact of the converters to the sonotrode.

In this case, there may be an even number of converters, in particular two, four or six. Clearly, depending on the requirement, designs having an odd number of converters may also likewise be used.

Preferably, when the apparatus is operated as intended, the sonotrode forms approximately a quarter wavelength in the direction of action. The sonotrode is normally realized as a resonator, in such a manner that its resonant frequency substantially matches the frequency provided by the generator used. Preferably in this case, a natural vibration is excited that is as deep as possible, and that is therefore normally also particularly stable and favorable in respect of energy.

Advantageously, when the apparatus is operated as intended, the apparatus forms approximately a half wavelength in the direction of action. In particular, in the case of the apparatus being realized as a half wavelength, the sonotrode head and the reaction body, as free ends of a resonator, deflect in a diametrically opposed manner relative to a nodal plane. In the nodal plane, an amplitude largely vanishes. In this way, in particular in the case of the sonotrode being realized with approximately a quarter wavelength, the nodal plane of the apparatus, when operated as intended in respect of the direction of action, is located in an end region of the sonotrode, at its back side.

In the region of the nodal plane, the sonotrode and, if appropriate, the entire apparatus, may be fastened to a fixed holding structure, since no oscillations, or scarcely any oscillations, occur there. Preferably, therefore, realized on the outside of the sonotrode there is a full-perimeter holding ledge, which is arranged in a plane perpendicular to the direction of action at the back side and which, when the apparatus is operated as intended, is located in the nodal plane. It is understood that, for this purpose, the components of the apparatus are realized accordingly and matched to each other.

The invention also relates to a packaging facility that comprises an apparatus according to the invention for ultrasonic welding. The apparatus in this case is preferably mounted on the holding ledge of the sonotrode in the packaging facility.

Figure 2:
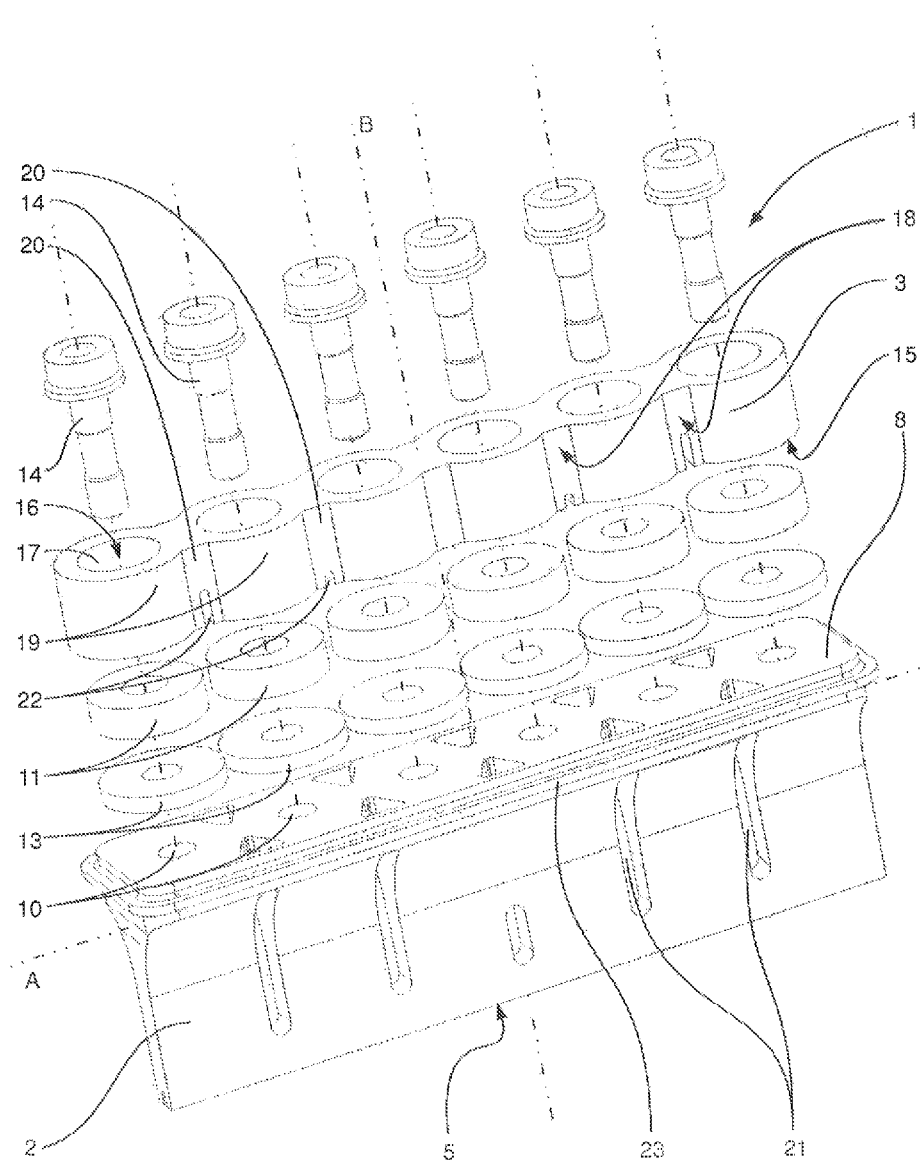
Figure 3:
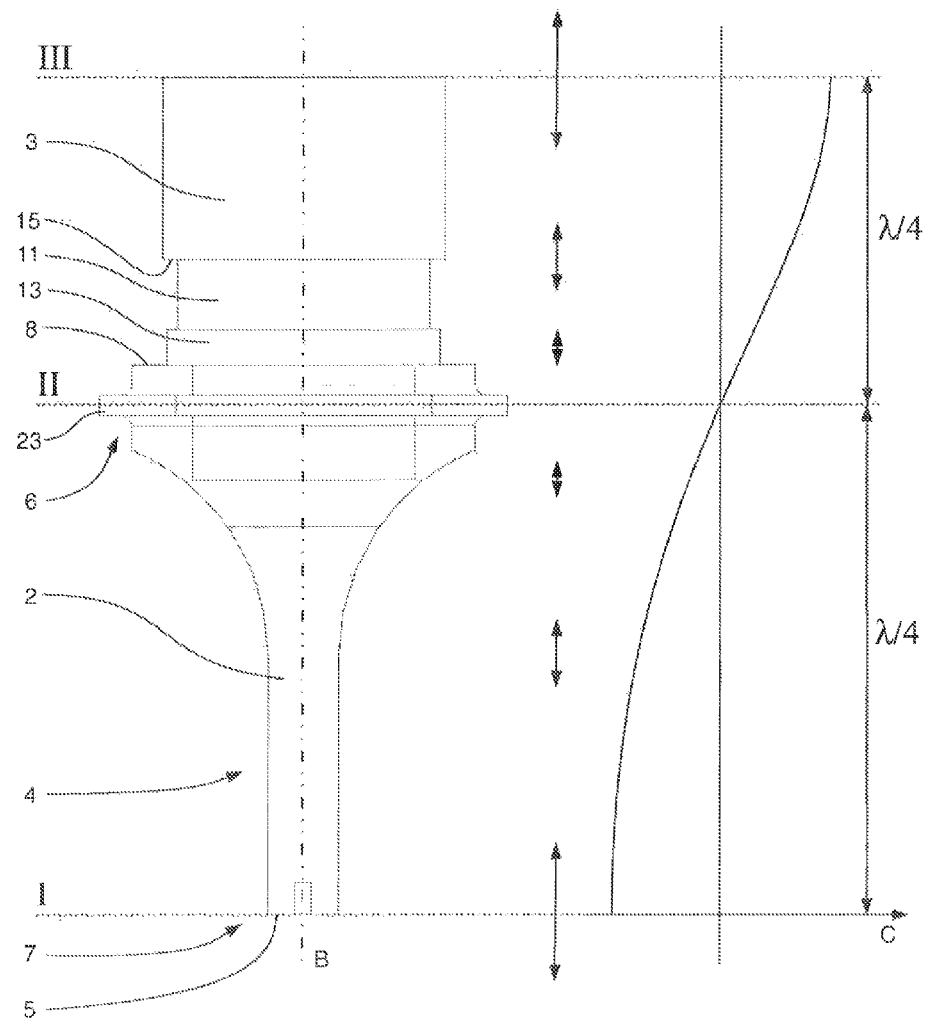

The invention, is explained in greater detail in the following on the basis of illustrations of exemplary embodiments. There are shown schematically in:

FIG. 1 an outer oblique view of an apparatus according to the invention for ultrasonic welding;

FIG. 2: an exploded representation of the view of FIG. 1;

FIG. 3: an outer view of the apparatus according to the invention in the longitudinal direction, with a schematically indicated characteristic of the amplitudes.

FIG. 1 shows an outer oblique view of an apparatus 1 according to the invention for ultrasonic welding. The apparatus 1 comprises a sonotrode 2 and a reaction body 3. The sonotrode 2 is of an elongate design, and defines a longitudinal direction A. The sonotrode 2 is designed to introduce longitudinal ultrasonic vibrations in a direction of action B, which is perpendicular to A. FIG. 2 shows an exploded representation of the view of FIG. 1. FIGS. 1 and 2 are described jointly in the following.

The sonotrode 2 has an elongate sonotrode head 4 realized in the shape of a blade. The sonotrode head 4 is oriented along A, and extends substantially over the entire length of the sonotrode 2. "In the shape of a blade" denotes a shape that is largely prismatic in the direction of A, and that, in a cross section perpendicular to A, tapers at least portionally in the direction of action B, from a base region 6 toward a working region 7 of the sonotrode 2. Preferably, the tapering cross section is delimited, at least portionally, by concave curves that converge in the direction of action B toward the working region 7. In the working region 7, the sonotrode head 4 in the present case has flanks that are largely parallel in cross section (for this see, for example, FIG. 3).

In the working region 7, the sonotrode head 4 is delimited, in the direction of action B by a welding surface 5. The welding surface 5 has a narrow rectangular shape, and is oriented perpendicularly in relation to the direction of action B, with its longitudinal direction parallel to A. The welding surface 5 constitutes an end of the sonotrode 2 on the working region side. In other words, the sonotrode 2 does not have any elements or structures that project beyond the welding surface 5 in the direction of B. Realized along A on the welding surface 5 is a longitudinal groove, which provides an engagement region for a knife, e.g. a packaging facility (not represented), by means of which the weld material can be severed in the weld seam after a welding operation.

The sonotrode 2, in particular the sonotrode head 4, is opened in the direction transverse to A, by slots 21 oriented along B. The slots 21 serve to compensate unwanted vibration modes transverse to the direction of action B. A slot realized centrally in the longitudinal direction A is shorter than the other slots 21. In the longitudinal direction A, the slots 21 are each realized between the positions of converters 11 (see below).

Realized in the base region 6 is a back side 8 of the sonotrode 2, which is constituted by a substantially continuous, planar surface. The back side 8 has recesses 9, throughholes and/or screw holes 10 in places. The back side 8 is oriented such that if is perpendicular to the direction of action 3, and therefore parallel to the welding surface 5. In the direction of action B, the back side 8 constitutes an end of the sonotrode 2 on the base region side, i.e. the sonotrode 2 does not have any elements or structures that project beyond the back side 8 in the direction of B.

Arranged in the base region 6, at the back side 8 of the sonotrode 2, there is an outer, full-perimeter holding ledge 23. The holding ledge 23 is realized as a strip-type projection and extends in a plane perpendicular to B. The components of the apparatus 1 are dimensioned in such a manner, and matched to each other for the intended operation in such a manner, that a nodal plane of the vibration excited during operation as intended coincides with the plane of the holding ledge 23. It is thereby ensured that the holding ledge 23 executes substantially no vibrations, and the apparatus 1 can thus be fastened, at the holding ledge 23, to a fixed structure, e.g. to a packaging facility.

According to the invention, the ultrasonic vibrations are introduced into the sonotrode 2 on the back side B. For this purpose, the apparatus comprises six ultrasonic converters 11, which are arranged on the back side 8 of the sonotrode 2. Each of the converters 11 comprises a stack of circular, piezoelectric ceramic plates (not represented), arranged between which there are electrically conductive metallic layers for control by a generator (not represented). Each of the converters 11 therefore has a largely circular cylindrical shape, a primary direction of action of the converters 11 being coincident with the cylinder axis thereof. The end faces of the converters 11 in this case each constitute mutually plane-parallel connection surfaces. Also realized in the converters 11 are through-holes, extending through them in their longitudinal direction. The through-holes serve as through-passages for screws 14, by means of which the reaction body 3 is screw-connected to the sonotrode 2.

The converters 11 are arranged on the back side 8, with their longitudinal direction, i.e. with their primary direction of action, parallel to the direction of action B, via a respective contact plate 13 made of aluminum. The contact plates 13 are likewise circular with a central through-passage, and slightly overlap the converters 11, parallel to the back side 8. The contact plates 13 provide for an optimum thermal and mechanical contact of the converters 11 to the sonotrode 2.

One of the screw holes 10 of the sonotrode 2 is assigned to each of the converters 11. The screw holes 10 are realized as blind holes and oriented in the direction of action B. In the direction of A, the screw holes 10 are realized with uniform spacing, centrally in the direction transverse to A, on the back side 8 of the sonotrode 2. The through-passages of the converters 11 and of the contact plates 13 are in alignment with the screw holes 10, such that the screws 14 can project through the through-passages and can be screwed into the screw holes 10. The converters 11 are thus arranged in succession in the longitudinal direction A, adjacent converters 11 having a constant distance in relation to each other. The converters 11 in this case are distributed uniformly over the back side 8, along A, and on all sides reach substantially as far as a perimeter of the back side 8.

The reaction body 3 is arranged on a side of the converters 11 that faces away from the sonotrode 2. The reaction body 3 is realized as an elongate bar, and is oriented with its longitudinal direction parallel to A. The reaction body 3 is dimensioned in such a manner that it completely overlaps at least all converters 11 in each direction transverse to B. A side of the reaction body 3 that faces toward the sonotrode 2 is realised as a largely continuous, planar bearing contact surface 15. The bearing contact surface 15 is oriented parallelwise in relation to the back side 8, and bears against the end faces of ail converters 11 that face away from the sonotrode 2.

The reaction body 3 has through-passages 16 that are in alignment with the screw holes 10 and through which the screws 14 project. At each through-passage 16, there is a recess 17 realised on a side that faces away from, the sonotrode 2, in which a screw head of the screws 14 is arranged and supported on the reaction body 3. The bearing contact surface 15 and the side of the reaction body 3 that faces away from the sonotrode 2 are realized so as to be plane-parallel.

The reaction body 3 is fastened to the sonotrode 2 by means of the screws 14. The converters 11 in this case are fixedly clamped-in between the back side 8 of the sonotrode 2 and the bearing contact surface 15 of the reaction body 3. Since the screws 14 project centrally through the through-passages of the converters 11, the converters 11, on the one hand, are secured against being displaced transversely in relation to B and, on the other hand, are pressed optimally, via the contact plates 13, on to the back side 8 and directly on to the bearing contact surface 15. An optimum thermal and mechanical contact, between the converters 11 and the sonotrode 2, on the one hand, and the reaction body 3, on the other hand, is thereby ensured.

In regions between the converters 11, in a direction transverse to A and B, the reaction body 3 has narrowings 18 that define bearing contact regions 19 for the converters 11. The narrowings 18 sire realized in such a manner that the bearing contact regions 19 are largely circular in form and in each case slightly overlap the converters 11 in each direction perpendicular to B. In a top view along B, therefore, the reaction body 3 has the form of circular portions 19, arranged in series, that are connected to each other via webs 20 at the locations of the narrowings 18.

In some of the webs 20, there are slots 22, oriented along B, that extend completely through the reaction body 3 in the direction transverse to A. The slots 22 in this case are open on the bearing contact face 15, toward the sonotrode 2. There is no slot realized on the web 20 between the two middle converters 11. Slots 22 having a first depth in the direction of B are realized on the adjacent webs 20. The webs 20 nearest to the longitudinal ends of the reaction body 3 have slots 22 that have a second, greater depth in the direction of B. As a result, the reaction body 3 has a vibration characteristic that varies with its longitudinal direction, in order, for example, to compensate unwanted vibration modes. Depending on the requirement, or depending on the design of the sonotrode or of other components of the apparatus, the slots in the webs may also be realized in a different manner.

FIG. 3 shows an outside view of the apparatus 1 along A, wherein a characteristic of the amplitude C is indicated schematically as a function of a position along B of the vibration excited during operation as intended. Position I, at the welding surface 5 in the working region. 7 of the sonotrode 2, has a maximum amplitude. Located at position II is the nodal plane, at which the amplitude largely vanishes. At position III, on the side of the reaction body 3 that faces away from the sonotrode 2, the reaction body 3 likewise vibrates with a maximum amplitude. A distance from the welding surface 5 to the holding ledge 23, which is to be located in the nodal plane, is thus a quarter of the wavelength of the vibration excited during operation as intended. Accordingly, the sonotrode 2 is to be realised such that it is matched to the desired operating frequency, e.g. in respect of the material, shape, size, etc. The same applies to the rest of the components such as, for example, the converters 11 and the reaction body 3. Overall, the apparatus 1 thus produces a resonator having a half wavelength of the vibration excited during operation as intended.

The invention claimed is:

1. An apparatus for ultrasonic welding comprising:
   a sonotrode having an elongate sonotrode head, realized on which there is an elongate welding surface oriented in the longitudinal direction of the sonotrode head, and
   at least two converters for exciting ultrasonic vibrations of the sonotrode in a direction of action,
   wherein the direction of action is preferably oriented substantially perpendicularly in relation to the longitudinal direction of the sonotrode head,
   a reaction body as a reaction mass, and
   the at least two converters are arranged between the sonotrode and the reaction body.

2. The apparatus according to claim 1, wherein the sonotrode has a largely continuous back side which is opposite the welding surface in the direction of action and against which the at least two converters bear.

3. The apparatus according to claim 1, wherein the reaction body has, on the sonotrode side, a bearing contact surface against which the at least two converters bear.

4. The apparatus according to claim 3, wherein the bearing contact surface of the reaction body and the back side of the sonotrode are oriented substantially parallel.

5. The apparatus according to claim 1, wherein the at least two converters are clamped in between the reaction body and the sonotrode.

6. The apparatus according to claim 1, wherein there is a screw assigned to each of the at least two converters, by which screw the reaction body is screw-connected to the sonotrode.

7. The apparatus according to claim 1, wherein the reaction body is realized so as to be elongate and is oriented with its longitudinal direction parallel to the longitudinal direction of the sonotrode head.

8. The apparatus according to claim 1, wherein the at least two converters are disposed, in series, in the longitudinal direction of the sonotrode head.

9. The apparatus according to claim 1, wherein the reaction body has a narrowing in a region between the at least two converters.

10. The apparatus according to claim 1, wherein the reaction body has a slot a region between two converters that are adjacent in the longitudinal direction.

11. The apparatus according to claim 10, wherein there is a slot realized in each region between two converters that are adjacent in the longitudinal direction.

12. The apparatus according to claim 1, wherein the sonotrode is realized so as to be substantially mirror-symmetrical with respect to a plane perpendicular to the longitudinal direction of the sonotrode head.

13. The apparatus according to claim 1, wherein each of the at least two converters comprises at least one piezoelectric ceramic plate.

14. The apparatus according to claim 1, wherein the apparatus has an even number of converters.

15. The apparatus according to claim 1, wherein, when the apparatus is operated as intended, the sonotrode forms approximately a quarter wavelength in the direction of action.

16. The apparatus according to claim 1, wherein, when the apparatus is operated as intended, the apparatus forms approximately a half wavelength in the direction of action.

17. The apparatus according to claim 1, wherein, realized on the outside of the sonotrode, there is a full-perimeter holding ledge which is arranged in a plane perpendicular to the direction of action and at the back side and which, when the apparatus is operated as intended, is located in a nodal plane.

18. The apparatus according to claim 1, wherein the direction of action is oriented substantially perpendicularly in relation to the longitudinal direction of the sonotrode head.

19. A packaging facility comprising an apparatus for ultrasonic welding according to claim 1.

* * * * *